(12) United States Patent
Arnal et al.

(10) Patent No.: US 6,557,719 B1
(45) Date of Patent: May 6, 2003

(54) FUEL TANK EQUIPPED WITH A GAS EVACUATING SYSTEM

(75) Inventors: André Arnal, Frontonas; Philippe Decobert, Paillart; Alexis Rosseel, Compiegne, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/403,451

(22) PCT Filed: Feb. 19, 1999

(86) PCT No.: PCT/FR99/00380

§ 371 (c)(1),
(2), (4) Date: May 11, 2000

(87) PCT Pub. No.: WO99/42318

PCT Pub. Date: Aug. 26, 1999

(30) Foreign Application Priority Data

Feb. 19, 1998 (FR) .............................. 98 02020

(51) Int. Cl.[7] .............................................. B65D 51/00
(52) U.S. Cl. ...................... 220/562; 220/4.12; 220/373
(58) Field of Search .................... 220/562, 373, 220/563, 4.12, 495.01

(56) References Cited

U.S. PATENT DOCUMENTS

| | | | | |
|---|---|---|---|---|
| 3,294,278 A | * | 12/1966 | Madden et al. | ............. 220/563 |
| 4,077,884 A | * | 3/1978 | Naumann | ............... 220/563 X |
| 5,215,312 A | * | 6/1993 | Knappe et al. | .......... 220/373 X |
| 6,155,449 A | * | 12/2000 | Moriyama | ......... 220/495.01 X |
| 6,196,409 B1 | * | 3/2001 | Lake et al. | ............. 220/373 X |

FOREIGN PATENT DOCUMENTS

| | | |
|---|---|---|
| DE | 40 06 465 A1 | 9/1991 |
| DE | 43 12 374 A1 | 10/1994 |
| WO | 96/38316 | 12/1996 |

* cited by examiner

Primary Examiner—S. M. Pollard
(74) Attorney, Agent, or Firm—Schweitzer Cornman Gross & Bondell LLP

(57) ABSTRACT

The invention relates to a fuel tank comprising a vessel for containing fuel and a system for evacuating the gases contained in the vessel. The system has a passage putting the inside of the vessel into communication with the outside of the vessel, and the passage is closed by a membrane suitable for allowing air and fuel vapor to pass therethrough while preventing liquid fuel from passing therethrough. The membrane is situated inside the vessel and it extends over the major portion of the top wall of the vessel.

7 Claims, 2 Drawing Sheets

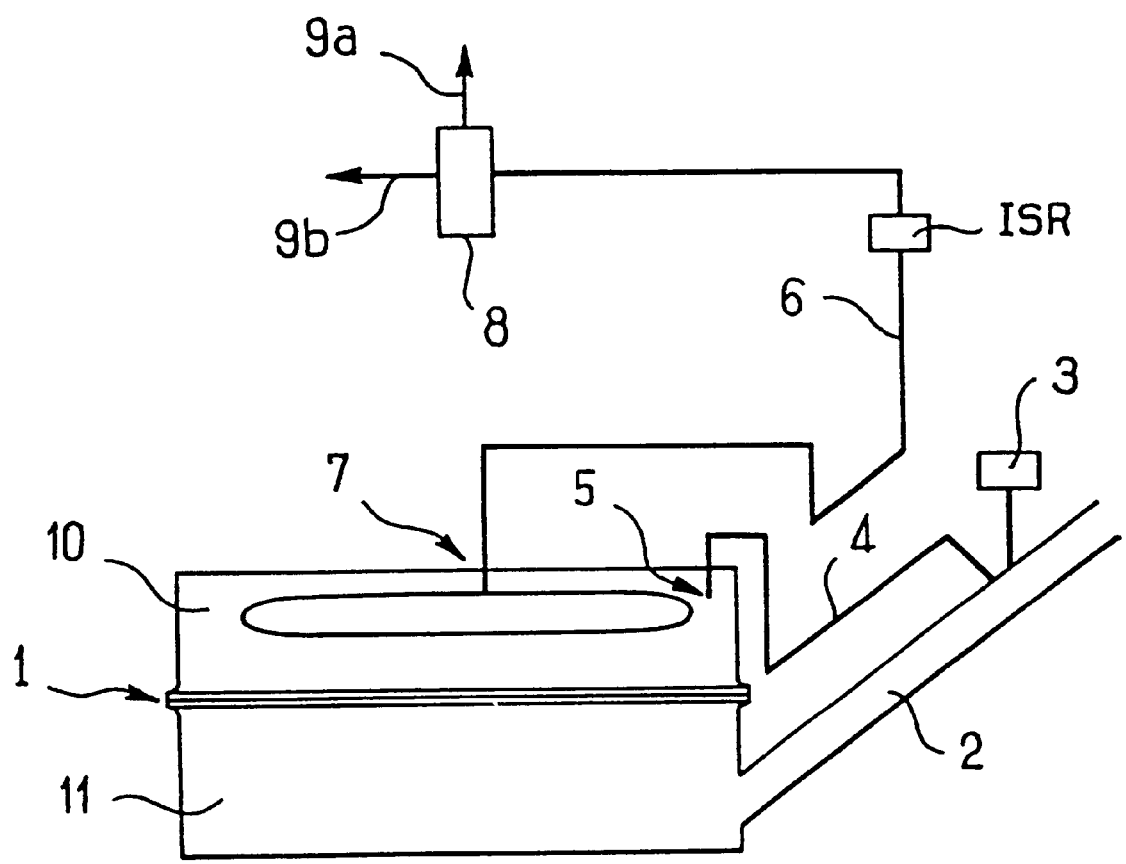
FIG_1

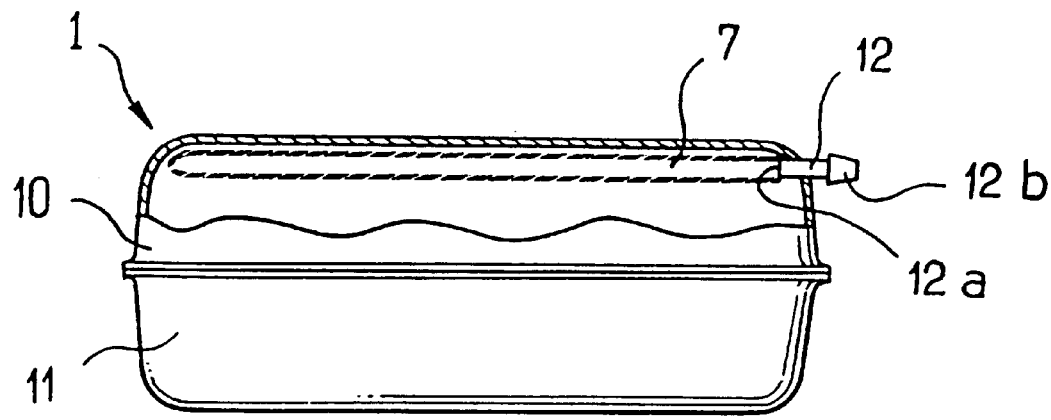
FIG_2
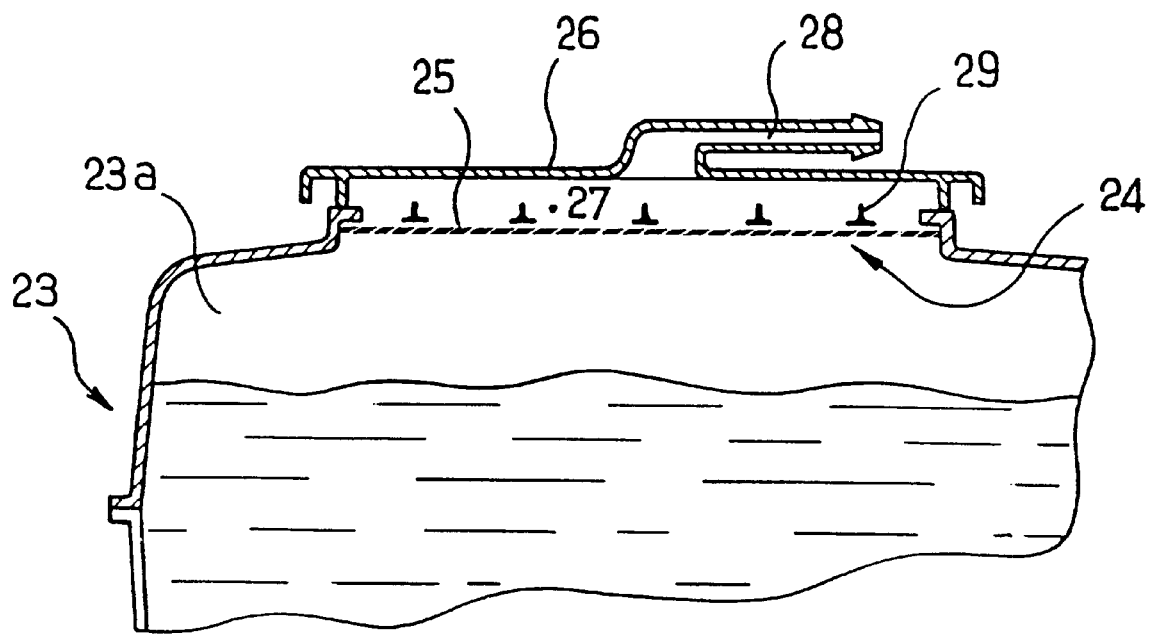
FIG_3

FUEL TANK EQUIPPED WITH A GAS EVACUATING SYSTEM

The present invention relates to a fuel tank comprising an vessel for containing fuel and a gas evacuation system.

BACKGROUND OF THE INVENTION

In order to fill a fuel tank without causing fuel to back up in the filler tube, it is known that the gas contained in the tank must be allowed to escape as the level of liquid in the tank rises.

It is also known that the motion of a vehicle subjects its fuel tank to shaking that causes fuel vapor to appear over the liquid fuel, which fuel vapor must be evacuated since otherwise the tank can be subjected to dangerous rises in pressure.

However, it will be understood that evacuating fuel vapor in this way must take place without any liquid fuel being able to escape from the tank together with the vapor.

To this end, it is known to provide a tank with one or more gas evacuation ducts connected to respective devices (which are generally check valves) having various functions including the function of allowing gases to pass while preventing liquid fuel from passing. This is referred to as the separate liquid from vapor (SLV) function.

In addition, if the configuration of the tank makes it possible, those devices can perform additional functions such as, for example, preventing the tank being overfilled so that there always exists a bag of gas above the level of the liquid so as to preserve capacity for the volume of the fuel to expand or so as to prevent liquid fuel from flowing through the evacuation ducts in the event of the vehicle rolling over. This function is also known as the roll-over valve (ROV) function.

As a result, the structure of known devices is very complex, which gives rise to problems of cost and reliability, since the moving portions of said devices can jam in the open or in the closed position, which in either case prevents them from performing their functions.

There therefore exists a need for a device for evacuating gases that is reliable and cheap and that has no moving parts.

OBJECTS AND SUMMARY OF THE INVENTION

The present invention seeks to satisfy this requirement.

The present invention provides a fuel tank comprising a vessel for containing fuel and a gas evacuation system contained in the vessel, said system having a passage putting the inside of the vessel into communication with the outside of the vessel and a membrane closing said passage, the membrane being suitable for allowing air and fuel vapor to pass therethrough while preventing liquid fuel from passing therethrough, wherein the membrane is situated inside the vessel and extends over the major portion of the top wall of the vessel.

In a particular embodiment of the invention, the membrane includes at least one layer of a porous fluorine-containing polymer of open-cell structure.

Such a membrane can be made of a material known under the trademark GORETEX.

To implement the invention, it is also possible to use the "PERMEON" membrane from EGC Corporation, Houston, Tex., USA.

The membrane of the invention can be placed at any point of the tank situated above the liquid level, so as to remain permanently in communication with the volume of gas enclosed in the vessel, thereby enabling said volume of gas to remain substantially at atmospheric pressure.

The membrane of the invention has the advantage that in addition to performing the SLV function, it replaces the ROV device which prevents liquid fuel from escaping via the fuel vapor evacuation duct in the event of the vehicle rolling over.

Thus, the membrane of the invention performs both the SLV and the ROV functions.

In a particular embodiment, the passage is made by an opening formed through the top wall of the vessel, the membrane extending across said opening, the fuel tank also having a closure member covering the membrane and closing the opening in leakproof manner, which closure member is fitted with a coupling endpiece for coupling to an evacuation duct to put the duct into communication with a space lying between the membrane and the closure member.

In this embodiment, the closure member can include a support grid extending substantially parallel to the membrane and supplying it with backing in the event of force being exerted by the liquid fuel contained in the vessel, e.g. while the vehicle is in motion or if the vehicle rolls over following an accident.

In a preferred embodiment, the vessel is obtained by bonding together two vessel portions obtained by injection molding, the bonding being performed by heat-sealing or adhesive.

The invention also provides a device comprising a fuel tank as described above and fuel vapor recovery means connected to the passage closed by the membrane and putting the inside of the vessel into communication with the outside of the vessel.

BRIEF DESCRIPTION OF THE DRAWINGS

In order to make the invention better understood, there follows a description of embodiments given as non-limiting examples, with reference to the accompanying drawings, in which:

FIG. 1 is a diagram of a device of the invention;

FIG. 2 is a section view of a fuel tank of the type shown in FIG. 1; and

FIG. 3 is a close-up view in section of a portion of a fuel tank in another embodiment of the invention.

MORE DETAILED DESCRIPTION

FIG. 1 shows diagrammatically a fuel tank 1 for a motor vehicle, the tank including a tube 2 for filling purposes.

The tube 2 is provided with a safety valve 3 that opens in the event of negative or positive pressure inside the tank exceeding predetermined values, and it is connected by a branch duct 4 to a point 5 of the tank 1.

Opening of the valve 3 is exceptional, and normally the tank is ventilated by means of a circuit 6 that is connected to the atmosphere and also to a high point of the tank 1.

A membrane 7 that is permeable to air and to fuel vapor, but that is impermeable to liquid fuel, is placed in said circuit 6 inside the vessel constituting the tank, so as to prevent liquid fuel leaving the tank, whatever the position of the tank.

The major portion of the membrane 7 extends across a horizontal section of the tank.

The membrane 7 thus performs two functions, one of separating liquid fuel from vapor, known as the "SLV"

function, and the other of providing safety in the event of the vehicle rolling over so as to prevent liquid fuel leaking through the circuit 6 in the event of the vehicle accidentally rolling over, also known as the "ROV" function.

The membrane 7 thus prevents any droplets of liquid fuel from being sucked out by the flow of gas flowing in the circuit 6, since such droplets could damage a filter 6 placed downstream from the membrane 7 for the purpose of recovering fuel vapor.

The filter 8 is also known as a "canister" and is known per se, and it contains active carbon, for example, to retain fuel vapor. It is provided with an outlet 9a to the atmosphere and with a vent 9b connected to the circuit for feeding fuel to the engine.

A device for preventing overfilling "ISR" is placed in the circuit 6 downstream from the membrane 7 and upstream from the filter 8.

This device is constituted, for example, by a conventional ball check valve, organized to close the circuit 6 while the tank is being filled so that during such filling, fuel backs up as soon as the liquid level reaches the point 5, thereby leaving sufficient volume of gas in the tank to absorb any expansion of the liquid fuel while in motion.

In this embodiment of the invention, the membrane 7 is constituted by "PERMEON" which is a fluorine-containing polymer having an open-cell structure that is sold by EGC Corporation.

The vessel of the fuel tank is constituted by a top portion 10 and by a bottom portion 11 that are obtained by injection molding.

In the embodiment of FIG. 2, the membrane 7 is in the form of a flat bag which extends over substantially the entire area of said vessel, i.e. over the major portion of the liquid contained in the tank.

Said membrane 7 in the form of a flat bag is mounted on the inside end 12a of an endpiece 12 that passes through the wall of the vessel and that has an outer end 12b shaped to constitute a quick coupling for connection to a gas evacuation duct (not shown) leading to a fuel vapor recovery device (not shown), such as a canister.

The endpiece 12 thus defines a passage between the inside and the outside of the vessel.

The large exchange area provided by such a membrane 7 contributes very significantly to its effectiveness and to the flow rate of gas in the evacuation duct.

In the embodiment of FIG. 3, the top portion 23a of the vessel 23, likewise obtained by injection molding, has an opening 24 of quite large dimensions, i.e. whose area occupies more than half of the horizontal section of the vessel.

A membrane 25 extends across this opening and enables the gas contained inside the vessel to pass therethrough, while preventing the liquid fuel from escaping.

A closure member 26 covers the membrane 25 and closes the opening 24 in leakproof manner, co-operating with the membrane 25 to define a space 27 in which only those gases that are contained within the vessel can penetrate.

This closure member 26 is provided with a coupling endpiece 28 for connection to a gas evacuation duct (not shown) which is thus put into communication with the space 27.

A grid 29 secured to the endpiece also serves to support the membrane 15 by providing it with backing so as to prevent it from tearing under the weight of liquid fuel in the event of the vehicle rolling over or under the pressure exerted by the liquid as it moves while the vehicle is in motion, thereby ensuring that the membrane performs the "ROV" function.

As in the preceding embodiments, the membrane described here enables the smallest quantity of gas contained in the vessel to escape, thereby avoiding any excess pressure while the vehicle is in motion.

It may also be observed that the vessel 23 in FIG. 3 can be obtained not only by making two vessel halves by injection molding, as shown, but also by blowing and then cutting out an opening 24.

Naturally, the embodiments described above are not limiting in any way and may be modified as desired without thereby going beyond the ambit of the invention.

What is claimed is:

1. A fuel tank comprising a vessel for containing fuel and a gas evacuation system contained in the vessel, said system having a passage putting the inside of the vessel into communication with the outside of the vessel and a membrane closing said passage, the membrane being suitable for allowing air and fuel vapor to pass therethrough while preventing liquid fuel from passing therethrough, wherein the membrane is situated inside the vessel and extends over the major portion of the top wall of the vessel.

2. A fuel tank according to claim 1, wherein the membrane is shaped as a flat bag.

3. A fuel tank according to claim 1, wherein the passage is made by an opening formed through the top wall of the vessel, the membrane extending across said opening, the fuel tank also having a closure member covering the membrane and closing the opening in leakproof manner, which closure member is fitted with a coupling endpiece for coupling to an evacuation duct to put the duct into communication with a space lying between the membrane and the closure member.

4. A fuel tank according to claim 3, wherein the closure member comprises a backing grid extending substantially parallel to the membrane and providing it with support in the event of thrust being exerted thereon by the liquid fuel contained in the vessel.

5. A fuel tank according to claim 1, wherein the membrane has at least one layer of porous fluorine-containing polymer of open-cell structure.

6. A fuel tank according to claim 1, the fuel tank being obtained by assembling together two injection molded portions of plastics material by means of adhesive or heat-sealing.

7. A device comprising a fuel tank according to claim 1, and fuel vapor recovery means connected to the passage closed by the membrane and putting the inside of the vessel into communication with the outside of the vessel.

\* \* \* \* \*